United States Patent
van Diggelen et al.

(10) Patent No.: US 7,948,434 B2
(45) Date of Patent: May 24, 2011

(54) METHOD AND SYSTEM FOR MAINTAINING A GNSS RECEIVER IN A HOT-START STATE

(75) Inventors: Frank van Diggelen, San Jose, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 20 days.

(21) Appl. No.: 12/270,759

(22) Filed: Nov. 13, 2008

(65) Prior Publication Data

US 2010/0117900 A1 May 13, 2010

(51) Int. Cl.
*G01S 19/29* (2010.01)
*G01S 19/31* (2010.01)

(52) U.S. Cl. ............................... 342/357.63; 342/357.71

(58) Field of Classification Search ............. 342/357.02, 342/357.06, 357.13, 357.15, 357.25, 357.63, 342/357.71; 701/207, 213
See application file for complete search history.

(56) References Cited

U.S. PATENT DOCUMENTS

| | | | | |
|---|---|---|---|---|
| 5,511,205 | A | * | 4/1996 | Kannan et al. ................. 713/324 |
| 5,592,173 | A | * | 1/1997 | Lau et al. .................. 342/357.12 |
| 2007/0152878 | A1 | | 7/2007 | Wang et al. |
| 2007/0159391 | A1 | | 7/2007 | Kuo et al. |
| 2008/0098246 | A1 | * | 4/2008 | Kim ............................... 713/323 |
| 2008/0117100 | A1 | | 5/2008 | Wang et al. |
| 2008/0117103 | A1 | | 5/2008 | Wang et al. |

OTHER PUBLICATIONS

European Search Report for European Patent Application No. 09013963.5-2220, dated Mar. 1, 2010.

* cited by examiner

*Primary Examiner* — Dao L Phan
(74) *Attorney, Agent, or Firm* — McAndrews, Held & Malloy, Ltd.

(57) ABSTRACT

Aspects of a method and system for maintaining a GNSS receiver in a hot-start state are provided. A GNSS receiver in a standby mode may transition from a sleep state to a wakeup state to acquire ephemeris from, for example, GPS signals, GALILEO signals, and/or GLONASS signals. The acquired ephemeris may be stored and utilized for the GNSS receiver to generate a navigation solution in a normal mode. The GNSS receiver may transition from the normal mode to the sleep state or the wakeup state in standby mode. A sleep period and a wakeup period for the full sleep-wakeup cycle in the standby mode may be predetermined or dynamically adjusted based on required QoS, quality of satellite signals, and/or user inputs. The sleep period and the wakeup period may be selected in a way to ensure a valid and complete ephemeris to be acquired.

22 Claims, 4 Drawing Sheets

METHOD AND SYSTEM FOR MAINTAINING A GNSS RECEIVER IN A HOT-START STATE

CROSS-REFERENCE TO RELATED APPLICATIONS/INCORPORATION BY REFERENCE

Not applicable

FIELD OF THE INVENTION

Certain embodiments of the invention relate to signal processing for communication systems. More specifically, certain embodiments of the invention relate to a method and system for maintaining a GNSS receiver in a hot-start state.

BACKGROUND OF THE INVENTION

A Global Navigation Satellite System (GNSS) such as the Global Positioning System (GPS) comprises a collection of twenty-four earth-orbiting satellites. Each of the GPS satellites travels in a precise orbit about 11,000 miles above the earth's surface. A GPS receiver locks onto at least three of the satellites to determine its position fix. Each satellite transmits a signal, which is modulated with a unique pseudo-noise (PN) code, at the same frequency. The GPS receiver receives a signal that is a mixture of the transmissions of the satellites that are visible to the receiver. The GPS receiver detects the transmission of a particular satellite based on corresponding PN code. For example, by correlating the received signal with shifted versions of the PN code for that satellite in order to identify the source satellite for the received signal and achieve synchronization with subsequent transmissions from the identified satellite.

When the GPS receiver is powered up, it steps through a sequence of states until it can initially determine a navigation solution comprising position, velocity and time. Afterwards, the satellite signals are tracked continuously and the position is calculated periodically. Precise orbital information, known as ephemeris or ephemeris data, transmitted by each satellite is used in calculating the navigation solution. Ephemeris or ephemeris data for a particular satellite may be decoded from orbit data once the GPS signal has been acquired. Each satellite broadcasts its own ephemeris data, the broadcast lasts for 18 seconds, repeating every 30 seconds.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for maintaining a GNSS receiver in a hot-start state, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for maintaining a GNSS receiver in a hot-start state. Various aspects of the invention may enable a GNSS enabled handset to operate in a normal mode and a standby mode. In the standby mode, the GNSS enabled handset may be configured to switch periodically or aperiodically between a sleep state in the standby mode and a wakeup state in the standby mode. For example, the GNSS enabled handset in the standby mode may be configured to transition from the sleep state in the standby mode to the wakeup state in the standby mode. In the wakeup state of the standby mode, the GNSS enabled handset may enable turning on corresponding GNSS front end to track satellite signals and acquire fresh navigation information such as fresh ephemeris from the satellite signals. The acquired fresh ephemeris may be stored and may be used for future start-ups of the GNSS enabled handset to generate a navigation solution in the normal mode. The satellites signals may comprise GPS signals, GALILEO signals, and/or GLONASS signals. The GNSS enabled handset may operate in various ways. For example, after the start-up for various operations in the normal mode, the GNSS enabled handset may be configured to return to either the sleep state or the wakeup state from the normal mode, or just stay in the normal mode. A sleep period of the sleep state and a wakeup period of the wakeup state may be predetermined or may be dynamically adjusted. The sleep period and the wakeup period may be determined based on QoS, quality of satellite signals, and/or user inputs. To generate a navigation solution for the GNSS enabled handset, the fresh ephemeris may be acquired after the GNSS enabled handset transitions from the sleep state in the standby mode to the wakeup state in the standby mode, and may be utilized. Accordingly, the sleep period may be chosen such that it is less than a period at which the fresh ephemeris is changed by one or more satellites, and the wakeup period may be chosen so that it is long enough to enable collection of the fresh ephemeris.

Figure 1:
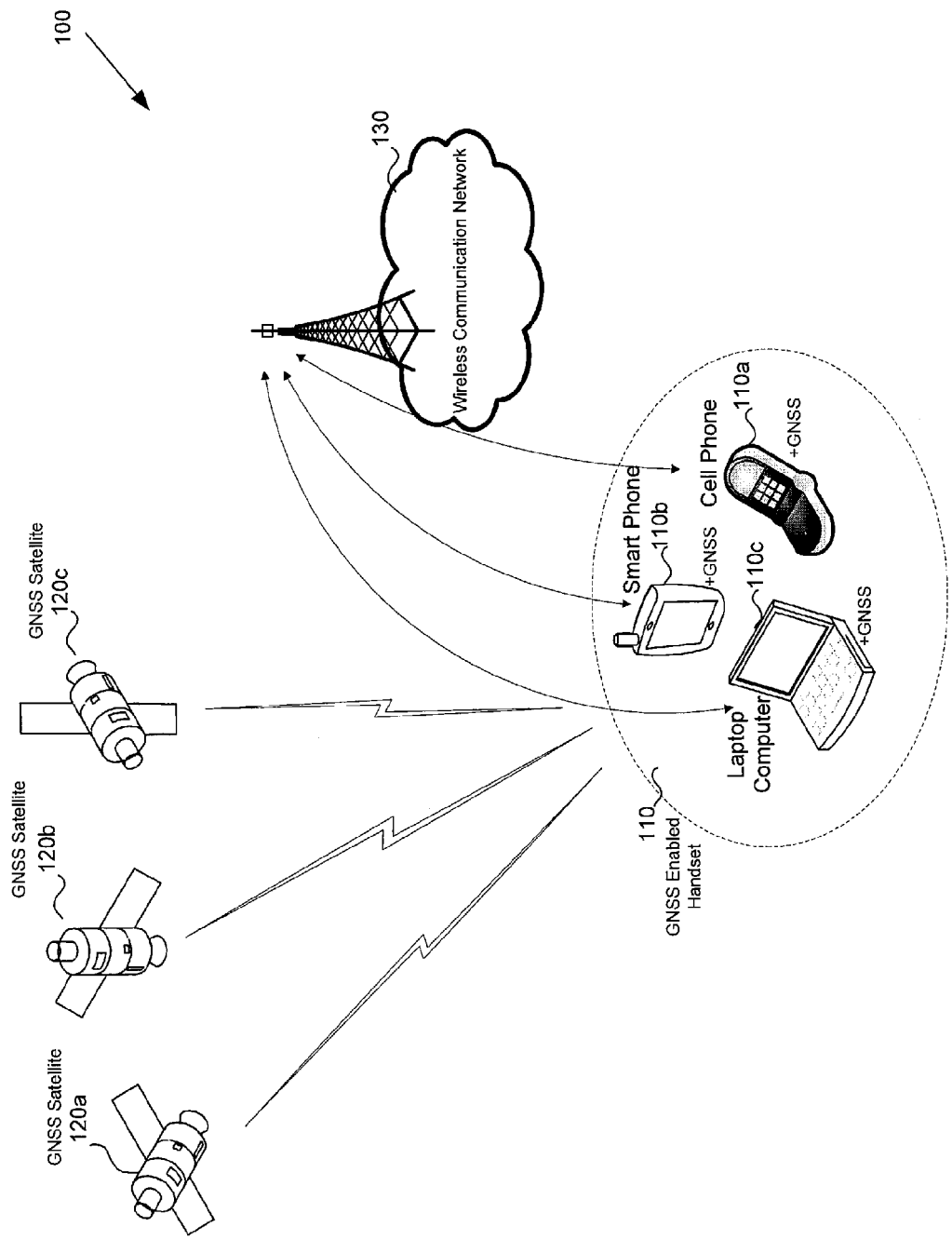
FIG. 1 is a diagram illustrating an exemplary GNSS satellite navigation system operable to maintain a GNSS receiver in a hot-start state, in accordance with an embodiment of the invention.

FIG. 1 is a diagram illustrating an exemplary GNSS satellite navigation system operable to maintain a GNSS receiver in a hot-start state, in accordance with an embodiment of the invention. Referring to FIG. 1, there is shown a GNSS satellite navigation system 100, comprising a GNSS enabled handset 110, of which a GNSS enabled cell phone 140a, a GNSS enabled smartphone 140b, and a GNSS enabled laptop 140c are presented, a plurality of GNSS satellites 120a-120c, and a wireless communication network 130.

The GNSS enabled handset 110 may comprise suitable logic circuitry and/or code that may be to receive satellite broadcast signals from the GNSS satellites 120a-120c to determine a position fix of the GNSS enabled handset 110. The GNSS enabled handset 110 may be capable of transmitting and/or receiving radio signals via the wireless communication network 130, which may be compliant with, for example, 3GPP, 3GPP2, WiFi, and/or WiMAX communication standards. The GNSS enabled handset 110 may support various operating modes such as, for example, a normal mode (high power) and a standby mode (lower power), to accomplish different tasks during the process of acquiring and maintaining the GNSS information.

The normal mode may comprise a mode in which the GNSS enabled handset 110 operates at its normal current consumption level to support its main system CPU to run all main functions normally. In the normal mode, the GNSS enabled handset 110 may utilize a high speed clock that consumer more power than a low speed clock that may be utilized for the standby mode.

The standby mode may comprise a mode in which the GNSS enabled handset 110 operates at it's a low current consumption level. For example, in the standby mode, the GNSS enabled handset 110 may operate at a low-power level to monitor and activate bus activity. In the standby mode, the GNSS enabled handset 110 may be configured to turn off main functions that depend on its main system CPU. In this regard, the GNSS enabled handset 110 in the standby mode may utilize a low frequency clock rather than a high frequency clock that is utilized in the normal mode.

In the standby mode, the GNSS enable handset 110 turns off corresponding radio components required for transmitting and/or receiving data via the wireless communication network 130. However, the GNSS enabled handset 110 may be configured to turn on or off radio components related to receiving GNSS data as needed. The GNSS enabled handset 110 in the standby mode may be in a wakeup state or a sleep state. The wakeup state in the standby mode corresponds to the situation that the GNSS enabled handset 110 is in the standby mode and is capable of receiving GNSS data. The sleep state in the standby mode corresponds to the situation where the GNSS enabled handset 110 is in the standby mode and is not capable if receiving GNSS data.

Depending on the knowledge of the GNSS information such as last GNSS position, current GNSS time and/or ephemeris data, the GNSS enabled handset 110 may apply different strategies for GNSS start-up, for example, a cold-start, a warm-start, or a hot-start, in acquiring GNSS information. In this regard, in a standby mode, the GNSS enabled handset 110 may be configured to maintain the GNSS information in a hot-start state by periodically waking up and running long enough to decode fresh ephemeris. The decoded fresh ephemeris may be used in subsequent startups to improve the time to first fix (TTFF) for the GNSS enabled handset 110.

The GNSS satellites 120a-120c may comprise suitable logic, circuitry and/or code that may be enabled to generate and broadcast suitable radio-frequency signals. The broadcast RF signals may comprise various navigation information such as orbital information, known as ephemeris or ephemeris data. The orbital information may comprise orbital location as a function of GNSS time. The broadcast ephemeris may change every two hours at the GNSS satellites 120a-120c and may be valid for a particular period of time into the future, for example, four hours. The broadcast ephemeris may be received and decoded by a GNSS satellite receiver, which may be integrated in the GNSS enabled handset 110. The broadcast ephemeris may be utilized to determine a navigation solution such as, for example, position, velocity, and clock information of the GNSS enabled handset 110.

The wireless communication network 130 may comprise suitable logic, circuitry and/or code that may be enabled to provide various voice and/or data services via CDMA 2000, WCDMA, GSM, UMTS, WiFi, or WiMAX communication standards.

In operation, the GNSS enabled handset 110 may be enabled to receive satellite broadcast signals from the GNSS satellites 120a-120c to determine a navigation solution such as a position fix of the GNSS enabled handset 110. A sequence of states may be executed to acquire and maintain the GNSS navigation information such as ephemeris in order to calculate the navigation solution for the GNSS enabled handset 110. For example, in a standby mode, the GNSS enabled handset 110 may be enabled to maintain ephemeris in a hot-start state by periodically waking up to acquire GNSS broadcast signals from the GNSS satellites 120a-120c and running long enough to decode ephemeris. The fresh ephemeris may be used in subsequent startups to improve the time to first fix (TTFF) of the GNSS enabled handset 110. The determined navigation solution may be used for various location based services via the GNSS enabled handset 110 and/or the wireless communication network 130.

Figure 2:
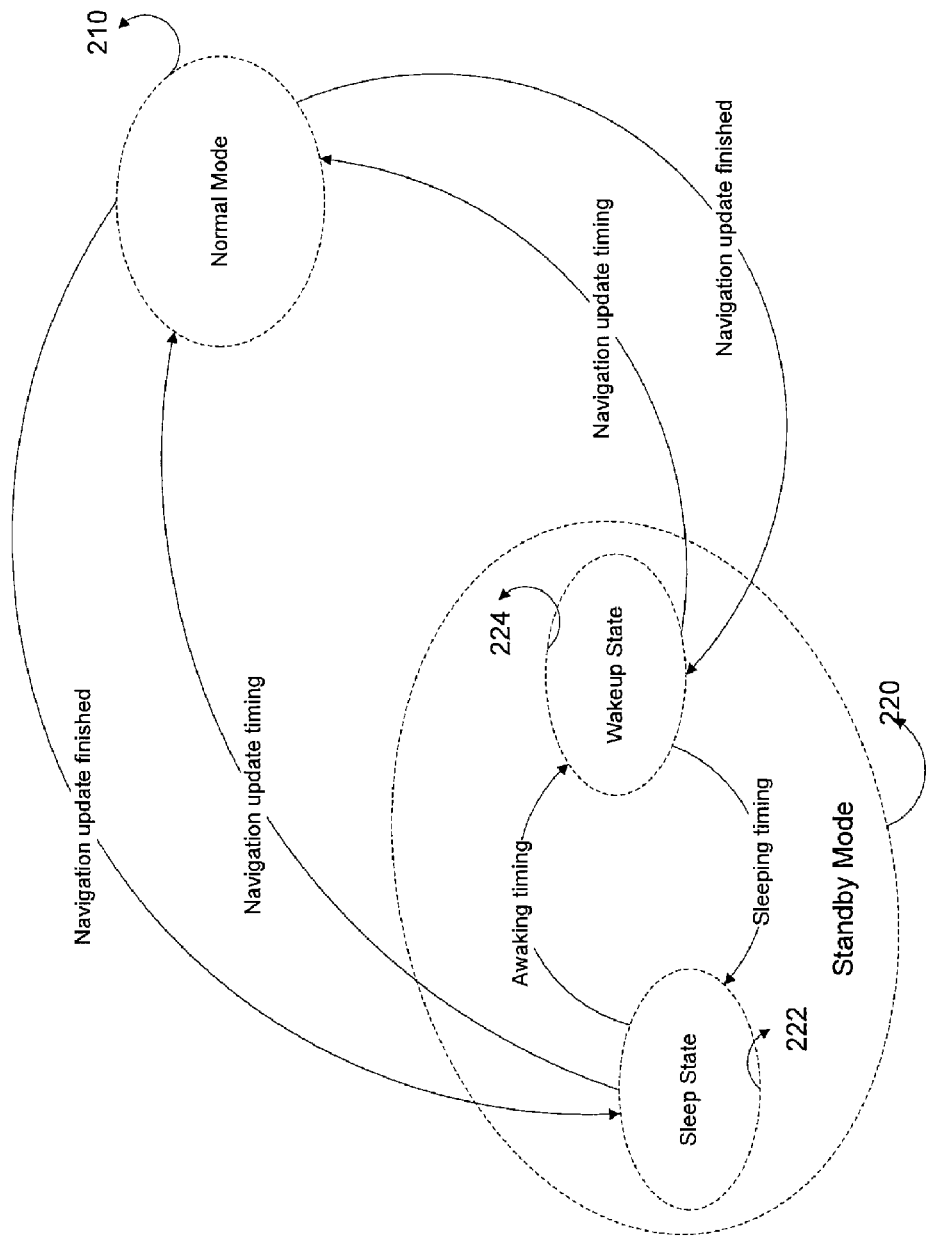
FIG. 2 is a state diagram illustrating an exemplary GNSS receiver operation that enables the GNSS receiver to be maintained in a hot-start state, in accordance with an embodiment of the invention.

FIG. 2 is a state diagram illustrating an exemplary GNSS receiver operation that enables the GNSS receiver to be maintained in a hot-start state, in accordance with an embodiment of the invention. Referring to FIG. 2, there is shown an exemplary operation state machine comprising a normal mode 210 and a standby mode 220. The standby mode 220 may comprise a sleep state 222 and a wakeup state 224.

In the normal mode 210, the GNSS enabled handset 110 may be fully powered to perform the functions of GNSS signal search, acquisition, measurement and satellite tracking. The period of a full operating cycle for the normal mode 210 may be software adjustable. The GNSS enabled handset 110 in the normal mode 210 may output position information at a user-defined rate. Depending on implementation, the GNSS enabled handset 110 may be configured to switch automatically between the standby mode 220 and the normal mode 210 to save power, or just stay in the normal mode after being switched from the standby mode. In the standby mode 220, the GNSS enabled handset 110 may be operating at minimal power, which may be significantly less than in the normal mode 210. In this regard, in the standby mode 220, the GNSS enabled handset 110 may be configured in the sleep state 222 or in the wakeup state 224. In the sleep state 222, the GNSS enabled handset 110 may be configured to turn off GNSS RF components to save power consumption.

The GNSS enabled handset 110 may be configured to periodically wake up and enter the wakeup state 224 from the sleep state 222 to acquire fresh ephemeris with lower power consumption. The ephemeris may change every two hours at satellites such as the GNSS satellites 120a-120c, and may be good for 4 hours. An appropriate wake up interval of, for example, every two hours, may be utilized. In the wakeup state 224, the GNSS enabled handset 110 may acquire ephemeris and maintain GNSS navigation information without being fully powered. For example, the GNSS enabled handset 110 may wake up without even turning on user interface components such as the display. During the wakeup state 224, the GNSS enabled handset 110 may stay on long enough to acquire a complete ephemeris. The GNSS enabled handset 110 may consume a small amount of battery power for various operations during the wakeup state 224. The GNSS enabled handset 110 may store the acquired ephemeris data to provide the fresh ephemeris for GNSS start-up to, for example, calculate a navigation solution or perform navigation update in the normal mode 210. The GNSS enabled handset 110 may return to the sleep state 222 or the wakeup state 224 in the standby mode 220 after the navigation update. Depending on implementation, the GNSS enabled handset 110 may stay in the normal mode after the navigation update. The period of a full sleep-wakeup cycle in the standby mode may be software adjustable via various timing control. For example, the GNSS enabled handset 110 may be configured via setting up a wakeup timer and/or a sleep timer for updating navigation information of the GNSS enabled handset 110. The wakeup timer and/or the sleep timer may be pre-determined and/or may be adjusted depending on, for example, required QoS and/or quality of the acquired ephemeris data.

Figure 3:
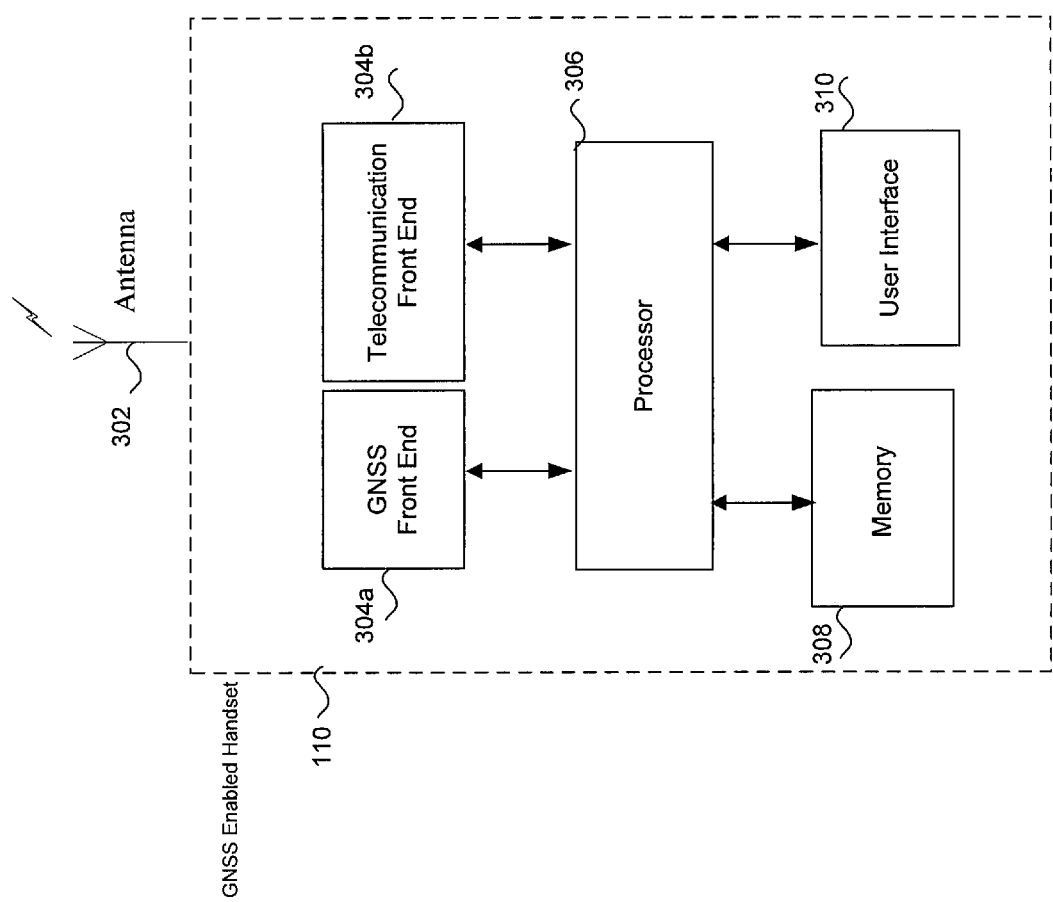
FIG. 3 is a diagram illustrating an exemplary GNSS enabled device comprising a GNSS receiver operable to be maintained in a hot-start state, in accordance with an embodiment of the invention.

FIG. 3 is a diagram illustrating an exemplary GNSS enabled device comprising a GNSS receiver operable to be maintained in a hot-start state, in accordance with an embodiment of the invention. Referring to FIG. 3, there is shown the GNSS enabled handset 110 comprising an antenna 302, a GNSS front end 304a, a telecommunication front end 304b, a processor 306, a memory 308, and a user interface 310.

The antenna 302 may comprise suitable logic, circuitry and/or code that may be enabled to receive L band signals from the plurality of GNSS satellites 120a-120c. The antenna 302 may be enable transmission and/or reception of radio signals via, for example, a 3G radio communication system, for communications among 3G devices.

The GNSS front end 304a may comprise suitable logic, circuitry and/or code that may be enabled to receive GNSS satellite broadcast signals via the antenna 302 and convert them to GNSS baseband signals for further baseband signal processing in the processor 306.

The front end 304b may comprise suitable logic, circuitry and/or code that may be enabled to transmit and/or receive radio frequency (RF) signals via a telecommunication network such as the wireless communication network 130 via the antenna 302. The front end 304b may enable conversion of the received RF signals to corresponding baseband signals, which may be suitable for further baseband signal processing in the processor 306.

The processor 306 may comprise suitable logic, circuitry and/or code that may be enabled to process received satellite signals as well as signals received from the wireless communication network 130. The processor 306 may be configured to extract navigational information from received satellite signals. The extracted navigation information may be utilized to determine navigational information such as a position fix for the GNSS enabled handset 110. The processor 306 may be programmed to turn on or off the GNSS front end 304a. For example, the processor 306 may periodically enter the standby mode 220 in which the GNSS front end 304a is turned on and information such as ephemeris from the GNSS satellites 120a-120c may be received. The processor 306 may enable the GNSS enabled handset 110 to operate by consuming a minimal amount of power during the wakeup state 224. For example, in the standby mode 220, the processor 306 may periodically wake up the GNSS front end 304a for receiving GNSS signals, extract, and store information such as ephemeris from the received GNSS signals without even turning on the display or other circuitry in the GNSS enabled handset 110 that is not required to enable receiving of the information. In instances when a navigation update may be required, for example, via the user interface 310 or via various upper layer applications from the wireless communication network 130, the processor 306 may provide the fresh ephemeris stored in the memory 308 for use.

The memory 308 may comprise suitable logic, circuitry, and/or code that may enable storing of information such as executable instructions and data that may be utilized by the processor 306. The executable instructions may comprise algorithms that may be applied to extract ephemeris from received GNSS broadcast navigation signals and to calculate a navigation solution from the extracted ephemeris. The data may comprise GNSS navigation information such as the extracted fresh ephemeris. The memory 308 may comprise RAM, ROM, low latency nonvolatile memory such as flash memory and/or other suitable electronic data storage.

The user interface 310 may comprise suitable logic, circuitry, and/or code that may enable presentation of navigation information. The navigation information may be presented graphically, aurally, in response to user input requests for a navigation update via, for example, a keyboard, a keypad, a thumbwheel, a mouse, touchscreen, audio, a trackball and/or other input method.

In operation, a plurality of radio signals may be received at the antenna 302 coupled to the GNSS enabled handset 110. The received plurality of radio signals may be communicated to the GNSS front end 304a or the telecommunication front end 304b, respectively, depending on the type of received radio signals. When the GNSS enabled handset 110 may be in the standby mode 220, the processor 306 may be enabled to switch the GNSS enabled handset 110 between the sleep state 222 and the wakeup state 224 periodically to save power. The wakeup state 224 may allow the processor 306 to wake up the GNSS front end 304a for receiving GNSS signals and to acquire navigation information such as ephemeris from the GNSS satellites 120a-120c by using a small amount of power. In the wakeup state 224, the processor 306 may be enabled to extract complete ephemeris from the received GNSS signals, and store the extracted ephemeris in the memory 308, accordingly. Various operations such as, for example, acquiring fresh navigation information from the satellite signals in the wakeup state 224 may be executed without even turning on the user interface 310 to save power. When a navigation update may be needed, the processor 306 may use the latest ephemeris stored in the memory 308 to generate a navigation solution.

Figure 4:
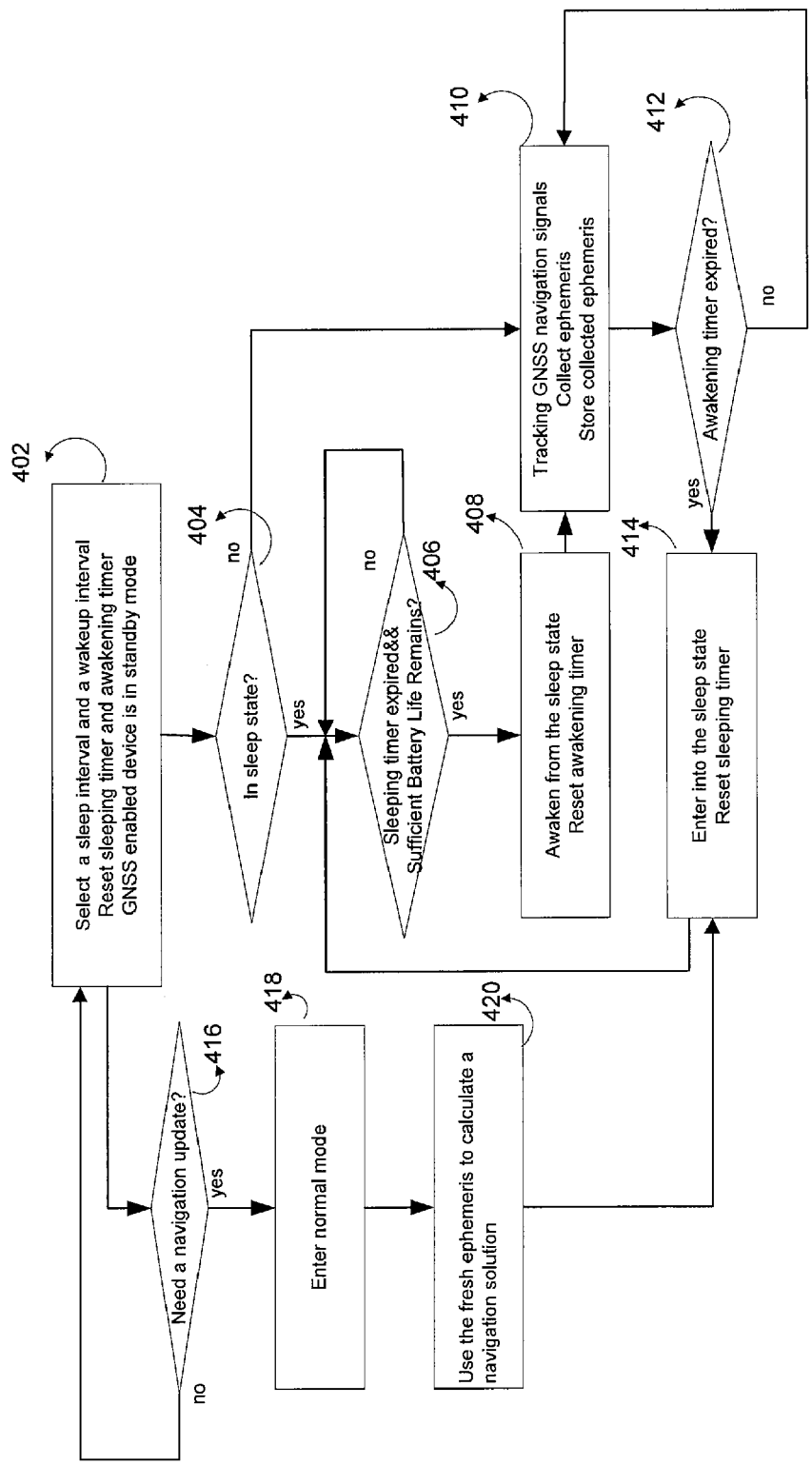
FIG. 4 is a flow chart illustrating exemplary steps for maintaining a GNSS receiver in a hot-start state, in accordance with an embodiment of the invention.

FIG. 4 is a flow chart illustrating exemplary steps for maintaining a GNSS receiver in a hot-start state, in accordance with an embodiment of the invention. Referring to FIG. 4, the exemplary steps start with the step 402. It is assumed that the GNSS enabled handset 110 may start in the standby mode 220. In step 402, the GNSS enabled handset 110 may select a sleep interval and a wake-up interval. The sleep interval and the wakeup interval may be predetermined or dynamically adjusted based on one or more factors comprising QoS, quality of the satellite signals, battery life, and user input. In addition, a sleep timer and a wakeup timer may be reset. The sleep timer and the wakeup timer may be used for timing control of the full sleep-wakeup cycle.

In step 404, it may be determined whether the GNSS enabled handset 110 may be in the sleep state 222. In instances where the GNSS enabled handset 110 may be in the sleep state 222, then, in step 406, it may be determined whether the sleep timer has expired and there may be sufficient battery life remained. In instances where the sleep timer may expire, then in step 408, the GNSS enabled handset 110 may wake up from the sleep state 224 and reset the awakening timer. In step 410, the GNSS enabled handset 110 may acquire GNSS navigation signals, acquire/decode a complete ephemeris from acquired GNSS navigation signals, and store the fresh ephemeris into the memory 308. In step 412, determine if the wake up timer has expired, in instances where the wakeup timer may expire, then in step 414, the GNSS enabled handset 110 may enter into the sleep state 222 and reset the sleep timer, then return to the step 406. In step 404, in instances where the GNSS enabled handset 110 may not be in the sleep state 222, the next step is step 410.

In step 406, in instances where the sleep timer has not expired and/or there may be no sufficient battery life remained, and then execution remains in step 406. In step 412, in instances where the wakeup timer has not expired, then the next step is step 410. The GNSS enabled handset 110 may be switched from the standby mode 220 (step 402) to the normal mode 210 for a navigation update. In step 416, it may be determined whether a navigation update is requested. In instances where the GNSS enabled handset 110 may request navigation information, then in step 418, the GNSS enabled handset 110 may enter the normal mode 210. In step 420, the processor 306 may access the memory 308 for the fresh ephemeris to determine the requested navigation information. The GNSS enabled handset 110 may then enter the sleep state 222. Depending on implementation and/or QoS requirements, the GNSS enabled handset 110 may be configured to return to the wakeup state 224 in the standby mode from the normal mode 210, or stay in the normal mode 210 after performing the navigation solution.

Aspects of a method and system for maintaining a GNSS receiver in a hot-start state are provided. In accordance with various embodiments of the invention, a navigation satellite system receiver such as the GNSS enabled handset 110 may operate in the normal mode 210 and the standby mode 220. In the standby mode 220, the GNSS enabled handset 110 may be configured to switch periodically or aperiodically between the sleep state 222 and the wakeup state 224. For example, the GNSS enabled handset 110 in the standby mode 220 may be enabled to transition from the sleep state 222 in the standby mode 220 to the wakeup state 224 in the standby mode 220. In the wakeup state 224, the processor 306 may turn on the GNSS front end 304a to track satellite signals and acquire fresh navigation information such as fresh ephemeris from the satellite signals. The acquired fresh navigation information comprising fresh ephemeris may be stored in the memory 308 and may be used to provide for a start-up of the GNSS enabled handset 110. The GNSS enabled device 110 may utilize the fresh navigation information to generate a navigation solution in the normal mode 210. After acquiring fresh ephemeris in the standby mode 220, the GNSS enabled handset 110 may transition from the wakeup state 224 in the standby mode 220 back to the sleep state 222 in the standby mode 220. The satellite signals may be GPS signals, GALILEO signals, and/or GLONASS signals.

The GNSS enabled handset 110 may be implemented, such that after the start-up for various operations in the normal mode 210, the GNSS enabled handset 110 may be configured to return to either the sleep state 222 in the standby mode 220 or the wakeup state 224 in the standby mode 220, or just stay in the normal mode 210. A sleep period of the sleep state 222 in the standby mode 220 and a wakeup period of the wakeup state 224 in the standby mode 220 may be predetermined or may be dynamically adjusted. The sleep period in the standby mode 220 and the wakeup period in the standby mode 220 may be determined based on exemplary factors comprising QoS, quality of satellite signals, and/or user inputs. The sleep period in the standby mode 220 may be selected or chosen so that it is less than a period at which said fresh ephemeris is changed by one or more satellites. The wakeup period in the standby mode 220 may be selected so that it is long enough for a period required for collection of the fresh ephemeris.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for maintaining a GNSS receiver in a hot-start state.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for satellite communication, the method comprising:
when a navigation satellite system receiver is in a sleep state during a standby mode operating at a low frequency clock, transitioning from said sleep state to a wakeup state during said standby mode to acquire fresh ephemeris; and
when said navigation satellite system receiver subsequently transitions from said standby mode to a normal mode operating at a high frequency clock, determining navigation information utilizing said acquired fresh ephemeris.

2. The method according to claim 1, comprising transitioning from said wakeup state back to said sleep state in said standby mode, subsequent to said acquisition of said fresh ephemeris.

3. The method according to claim 1, wherein said fresh ephemeris is acquired from GPS signals, GLONASS signals, and/or Galileo signals.

4. The method according to claim 1, comprising storing said acquired fresh ephemeris in said navigation satellite system receiver.

5. The method according to claim 1, comprising returning to said sleep state in said standby mode from said normal mode of operation.

6. The method according to claim 1, comprising returning to said wakeup state in said standby mode from said normal mode of operation.

7. The method according to claim 1, comprising staying in said normal mode of operation after said transition from said standby mode to said normal mode of operation.

8. The method according to claim 1, wherein, for said standby mode, a sleep period of said sleep state and a wakeup period of said wakeup state are predetermined or dynamically adjusted.

9. The method according to claim 8, wherein said sleep period of said sleep state and said wakeup period of said wakeup state are determined based on QoS, quality of said acquired fresh ephemeris, and/or user inputs.

10. The method according to claim 8, wherein said sleep period of said sleep state is less than a period at which said fresh ephemeris is changed by one or more satellites.

11. The method according to claim 8, wherein said wakeup period of said wakeup state is greater than or equal to a period required for collection of said fresh ephemeris.

12. A system for satellite communication, the system comprising:
one or more circuits for use in a navigation satellite system receiver, wherein when said navigation satellite system receiver is in a sleep state during a standby mode operating at a low frequency clock, said one or more circuits are operable to enable transition from said sleep state to a wakeup state during said standby mode to acquire fresh ephemeris; and
said one or more circuits are operable to determine navigation information utilizing said acquired fresh ephemeris, when said navigation satellite system receiver subsequently transitions from said standby mode to a normal mode operating at a high frequency clock.

13. The system according to claim 12, wherein said one or more circuits are operable to enable transition from said wakeup state back to said sleep state in said standby mode, subsequent to said acquisition of said fresh ephemeris.

14. The system according to claim 12, wherein said fresh ephemeris is acquired from GPS signals, GLONASS signals, and/or Galileo signals.

15. The system according to claim 12, wherein said one or more circuits are operable to store said acquired fresh ephemeris in said navigation satellite system receiver.

16. The system according to claim 12, wherein said one or more circuits are operable to return to said sleep state in said standby mode from said normal mode of operation.

17. The system according to claim 12, wherein said one or more circuits are operable to return to said wakeup state in said standby mode from said normal mode of operation.

18. The system according to claim 12, wherein said one or more circuits are operable to stay in said normal mode of operation after said transition from said standby mode to a normal mode of operation.

19. The system according to claim 12, wherein, for said standby mode, a sleep period of said sleep state and a wakeup period of said wakeup state are predetermined or dynamically adjusted.

20. The system according to claim 19, wherein said sleep period of said sleep state and said wakeup period of said wakeup state are determined based on QoS, quality of said acquired fresh ephemeris, and/or user inputs.

21. The system according to claim 19, wherein said sleep period of said sleep state is less than a period at which said fresh ephemeris is changed by one or more satellites.

22. The system according to claim 19, wherein said wakeup period of said wakeup state is greater than or equal to a period required for collection of said fresh ephemeris.

* * * * *